(12) United States Patent  (10) Patent No.: US 7,093,579 B2
Dickerson et al.  (45) Date of Patent: Aug. 22, 2006

(54) METHOD AND APPARATUS FOR ADJUSTING FUEL INJECTION TIMING

(75) Inventors: Steven J. Dickerson, Lake In The Hills, IL (US); James T. Beaucaire, Glen Ellyn, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 88 days.

(21) Appl. No.: 10/787,991

(22) Filed: Feb. 26, 2004

(65) Prior Publication Data

US 2005/0188945 A1   Sep. 1, 2005

(51) Int. Cl.
*F02M 37/04* (2006.01)
*F02D 41/40* (2006.01)

(52) U.S. Cl. .................. 123/299; 123/300; 123/501

(58) Field of Classification Search ............. 123/229, 123/478, 300, 446, 501, 502, 299; 73/116, 73/117.2, 117.3, 118.1; 701/104, 105
See application file for complete search history.

(56) References Cited

U.S. PATENT DOCUMENTS

| | | | |
|---|---|---|---|
| 6,314,945 B1 * | 11/2001 | Sugiyama et al. | 123/506 |
| 6,328,018 B1 * | 12/2001 | Akasaka et al. | 123/487 |
| 6,354,269 B1 * | 3/2002 | Saito et al. | 123/436 |
| 6,415,655 B1 * | 7/2002 | Loof et al. | 73/117.3 |
| 6,415,762 B1 * | 7/2002 | Hafner et al. | 123/300 |
| 6,476,452 B1 * | 11/2002 | Suzuki | 257/378 |
| 6,536,209 B1 * | 3/2003 | Fluga et al. | 60/284 |
| 6,705,278 B1 * | 3/2004 | McGee et al. | 123/299 |
| 6,840,211 B1 | 1/2005 | Takahashi | |
| 6,843,222 B1 | 1/2005 | Sieber et al. | |

* cited by examiner

*Primary Examiner*—Tony M. Argenbright
*Assistant Examiner*—Johnny H. Hoang
(74) *Attorney, Agent, or Firm*—Susan L. Lukasik; Dennis K. Sullivan; Jeffrey P. Calfa

(57) ABSTRACT

A method and apparatus for adjusting fuel injection timing detects (401) a change in the number of fuel injections for a combustion chamber (105). During a timing adjustment period, the timing for fuel injection(s) may be adjusted (405) incrementally, e.g., in a series of steps or increments, and/or based at least in part on the time elapsed since the detected of the change in the number of fuel injections.

20 Claims, 2 Drawing Sheets

METHOD AND APPARATUS FOR ADJUSTING FUEL INJECTION TIMING

FIELD OF THE INVENTION

The present invention relates to internal combustion engines, including but not limited to fuel injection systems that use multiple injections of fuel into a combustion chamber of an engine.

BACKGROUND OF INVENTION

Internal combustion engines are known to operate with single or multiple injections of fuel into a combustion chamber of the engine. Multiple injections of fuel may be accomplished by either multiple fuel injectors or by a single fuel injector that is constructed and operated to allow for multiple injections. Typically, multiple injections of fuel include a pilot and a main injection. The relative volume of the pilot and main injections may differ considerably. Generally, the pilot injection is small in volume compared to a volume of the main injection.

The timing of fuel injection for desired engine performance depends on whether the engine is operating with or without pilot injections. Switching pilot injection on or off can affect engine performance. For example, engine roughness often occurs when engine operation is changed by adding or removing pilot fuel injection to a main fuel injection.

Accordingly, there is to eliminate engine performance problems related to the activation or deactivation of pilot injection in the fuel injection process.

SUMMARY OF INVENTION

A method of adjusting fuel injection timing comprises the steps of detecting a change in a number of fuel injections into a combustion chamber of an internal combustion engine, and in response to detection of the change, determining a timing adjustment period. During the timing adjustment period, the fuel injection timing is adjusted.

DESCRIPTION OF A PREFERRED EMBODIMENT

The following describes a method and apparatus for adjusting fuel injection timing when a change in the number of fuel injections for a combustion chamber is detected. During a timing adjustment period, the timing for fuel injection(s) may be adjusted incrementally, e.g., in a series of steps or increments, and/or based at least in part on the time elapsed since the detected of the change in the number of fuel injections.

Figure 1:
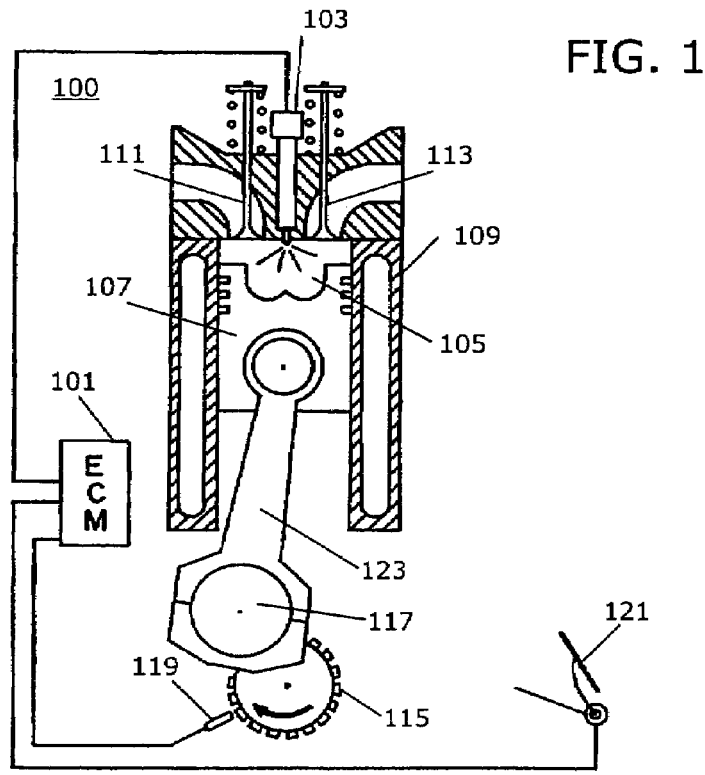
FIG. 1 shows an internal combustion engine having a fuel injection system in accordance with the invention.

An internal combustion engine 100 having a fuel injection system is shown in FIG. 1. An engine control module (ECM) 101 controls one or more fuel injectors 103 of the engine 100. The engine 100 shown comprises one or more combustion chambers 105, pistons 107, cylinders 109, inlet valves 111, outlet valves 113, and connecting rods 123, in addition to a crankshaft 117, a flywheel 115, engine speed sensor 119, and/or an accelerator pedal sensor 121 arranged to operate as known in the art.

One or more fuel injections are injected into the combustion chamber 105 during each engine cycle. When multiple injections are delivered, such injections may comprise a pilot injection and a main injection, as known in the art. A fuel injection event may comprise a main injection only, a pilot injection and a main injection, multiple pilot injections, and a main injection, as well as other combinations in various numbers of injections. Single or multiple injections of fuel may be selected depending on desired engine operation and performance.

The ECM 101 may include one or more microprocessors that control the operation of the fuel injection system and/or various other functions of the engine 100. The ECM 101 may provide control of the number of fuel injections, the timing of each of the one or more fuel injections, the amount of each fuel injection, and so forth. The ECM 101 may select single or multiple fuel injections based on engine load or torque. The ECM 101 may determine or adjust fuel injection timing based on ECM programming, inputs from engine or vehicle sensors 119 or 121, and so forth.

Fuel injection timing is typically measured in degrees relative to when the piston 107 is at a top dead center position in the cylinder 109. The ECM 101 may adjust fuel injection timing. The adjustment may be a combination of one or more offsets.

Figure 2:
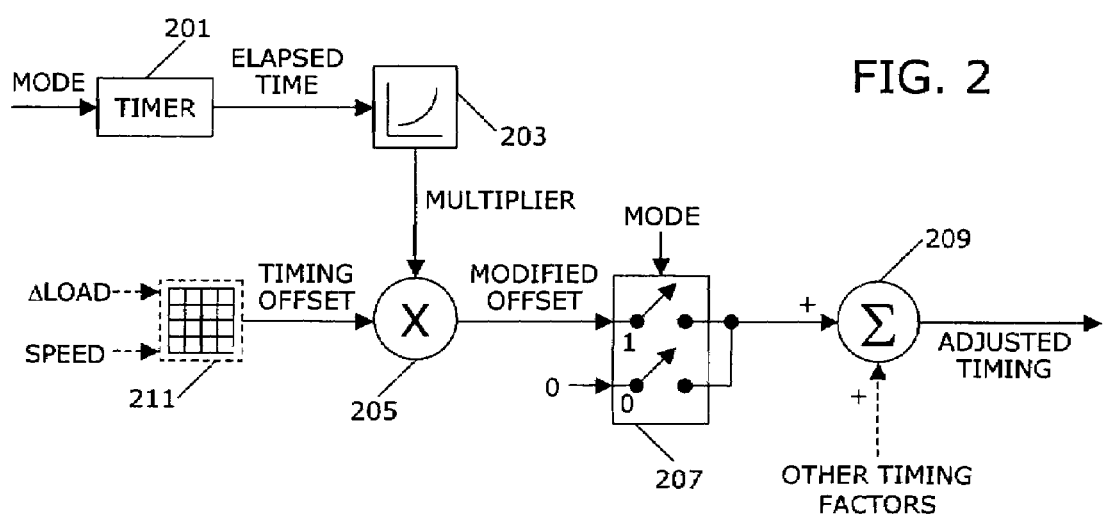
FIG. 2 illustrates a logic diagram for use with a fuel injection system in accordance with the invention.

A logic diagram for use with a fuel injection system is shown in FIG. 2. The logic may be implemented, for example, in a computer program that is executed by the ECM 101 and/or another processor that controls fuel injection timing. The fuel injection system is considered to operate in one of two modes. Mode 1 occurs when fuel injection timing adjustments are made to account for a change in the number of fuel injections, for example, between consecutive fuel injection events. A change in the number of fuel injections occurs, for example, when a change is made from main injection only to main plus pilot injection, from main plus pilot injection to main injection only, from main plus N pilot injections to main plus M pilot injections, where N is not equal to M, and so forth. Mode 1 lasts for a period of time that is referred to as a timing adjustment period. Mode 0 refers to steady state operation, when no fuel injection timing adjustment is made to compensate for a change in the number of fuel injections in a given engine cycle, which fuel injection timing is referred to as steady state fuel injection timing.

When the mode changes from 0 to 1, a timer 201 is started. The change in mode from 0 to 1 indicated a detected change in the number of fuel injections for an engine cycle. The output of the timer 201 indicates the elapsed time since the detection of a change in the number of fuel injections. The timer 201 is set for a time equal to the timing adjustment period. When the elapsed time of the timer 201 reaches the timing adjustment period, the mode changes from 1 to 0.

The output of the timer 201 is input to a converter 203 that converts the elapsed time into a multiplier. The multiplier may advantageously take on a value between 0 and 1. Other ranges of values for the multiplier may also be utilized. The multiplier is advantageously based at least in part on the time that has elapsed since the change in the number of fuel injections. Alternatively, the number of combustion cycles since the mode change may be used to calculate the multiplier at least in part. The converter 203 may be calibrated for a particular type of engine by correlating engine test data. For example, engine tests that determine fuel injection timing that reduce or eliminate engine roughness when changing the number of fuel injections may be used to calibrate the converter 203. The engine tests results may be used to determine a mathematical relationship that uses elapsed time as a variable to calculate the multiplier.

The multiplier is input to a combiner 205. The combiner combines the multiplier with a timing offset yielding a modified offset. As shown in FIG. 2, the multiplier is advantageously multiplied by the timing offset, in which case the combiner acts as a multiplier. Alternatively, the multiplier may be a factor that is added to or subtracted from the timing offset by the combiner 205. Other methods of combining may be utilized.

The timing offset may be, for example, pilot injection timing offset or main injection timing offset. If, for example, pilot injection timing was activated causing the change in the number of fuel injections, the timing offset input into the combiner 205 is pilot injection timing offset. Main injection follows pilot injection as desired in time. If, for example, pilot injection timing was deactivated causing the change in the number of fuel injections, the timing offset input into the combiner 205 is main injection timing offset. The timing offset may be determined in any number of ways. For example, a determine 211 having engine speed and change in engine load as inputs may be utilized to determine the timing offset.

The modified offset from the combiner 205 is input to a switch or multiplexer 207. The output of the switch 207 is controlled by the mode. When the mode is 0, i.e., steady state operation, the fuel injection timing offset related to change in the number of fuel injections is 0, and 0 is output by the switch 207. When the mode is 1, the modified offset is output by the switch 207. A combiner 209 combines the output of the switch 207, i.e., fuel injection timing offset related to change in the number of fuel injections, with other fuel injection timing factors as the fuel injection system may utilize. These factors may include, for example, timing adjustments for low or high altitude, oil temperature, transient to cruise engine operation, air temperature, engine speed, and so forth. The combiner 209 outputs adjusted fuel injection timing that is utilized to control fuel injections.

Figure 3:
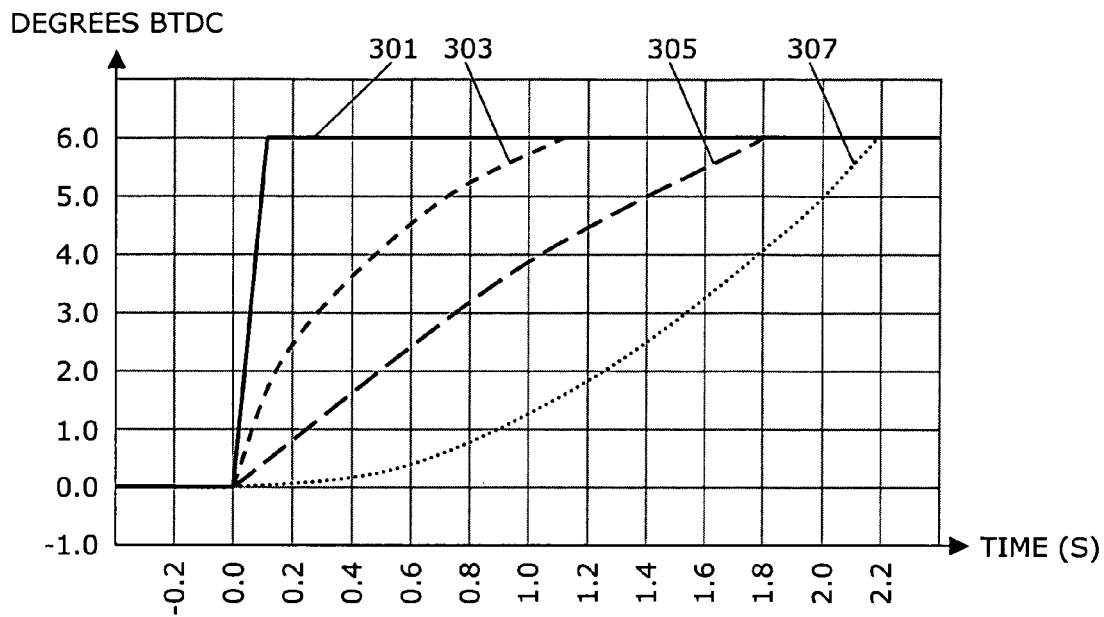
FIG. 3 is a graph illustrating various timing offsets versus time in accordance with the invention.

A graph illustrating various timing offsets versus time is shown in FIG. 3. For the sake of simplicity, time equals 0.0 seconds when the mode switches from 0 to 1, and the x-axis values denote the time elapsed since the mode change, i.e., since the number of fuel injections changed. Also for the sake of simplicity, the curves 301, 303, 305, and 307 are shown for engine conditions of constant engine speed and load.

The solid curve 301 illustrates the typical implementation of prior art solutions when, for example, pilot injection is added to a main injection. Fuel injection timing changes almost instantaneously from 0.0 degrees before top dead center (BTDC) to 6.0 degrees BTDC, the desired timing for the pilot injection. Engine roughness or stumbling may occur with such a quick change in state from no pilot injection to having a pilot injection.

Three curves 303, 305, and 307 illustrate three different curves of modified offsets, as described with respect to FIG. 2. Any number curves having other shapes than those shown may be utilized to achieve desired results. The curves 303, 305, and 307 shown in the example of FIG. 3 may be utilized when the number of fuel injections increases, for example, when pilot injection is activated or added to main injection or when the number of pilot injections increases. The sharpest curve 303 has the shortest timing adjustment period, less than 1.2 seconds. The middle curve 305 has a 1.8 second timing adjustment period. The most gradual curve 307 has the longest timing adjustment period of 2.2 seconds.

One of the curves 303, 305, and 307 may be utilized during a single timing adjustment period. During this period, each time a cylinder fires, the modified timing offset associated with the firing is determined from the curve by the time at which cylinder fires. If the cylinder fires at 0.4 seconds and curve 303 is utilized, the modified timing offset is approximately 3.5 degrees BTDC. As time passes, the modified timing offset incrementally or in steps increases until the target, or steady state timing, is achieved.

Alternatively, two or more of the curves may be utilized during a single timing adjustment period. For example, a cylinder firing at 0.4 seconds may utilize a timing offset of 0.2 degrees BTDC from the gradual curve 307, a cylinder firing at 0.6 seconds may utilize a timing offset of 2.5 degrees BTDC from the middle curve 305, and a cylinder firing at 0.8 seconds may utilize a timing offset of 5.2 degrees BTDC from the sharp curve 303. Such a progression may be made based on current operating conditions.

The curves 303, 305, and 307 are implemented in the converter 203. Similar curves that, for example, mirror the curves 303, 305, and 307 along the x-axis may be utilized to adjust timing when pilot injection is deactivated or the number of pilot injections is decreased, to decrease timing from, for example, 6.0 degrees BTDC to 0.0 degrees BTDC as time passes.

Figure 4:
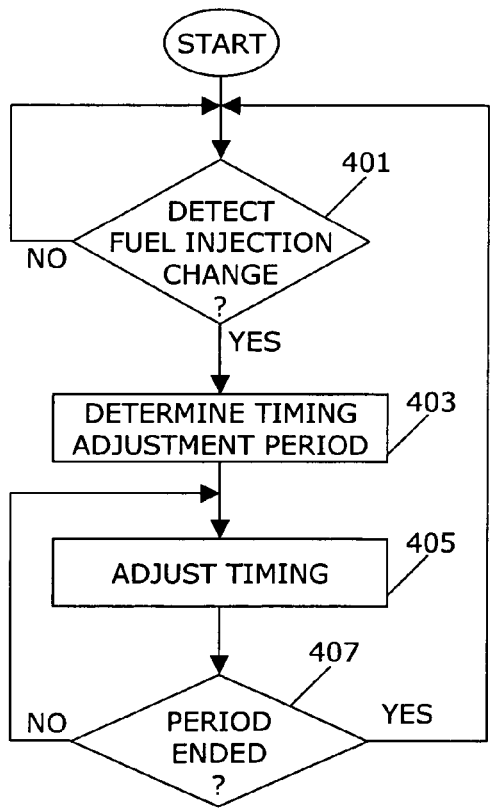
FIG. 4 is a flowchart illustrating a method of fuel injection timing adjustment in accordance with the invention.

A flowchart illustrating a method of fuel injection timing adjustment is shown in FIG. 4. At step 401, it is determined whether a change in the number of fuel injections has occurred. If no change is detected, the process continues to attempt to detect such a change at step 401. When a change is detected at step 401, the process continues with step 403, where the timing adjustment period is determined. The timing adjustment period may be selected, thereby establishing the timing curves 303, 305, and 307. Alternatively, the timing curves 303, 305, and 307 may be selected, thereby establishing the timing adjustment period. The timing adjustment period begins when the mode changes from 0 to 1, although a delay may implemented. At step 405, fuel injection timing is adjusted as described with respect to FIG. 2 until the timing adjustment period ends at step 407, and the process continues with step 401. When the timing adjustment period ends, the mode changes from 1 to 0.

Although the present invention is illustrated by the example of a single cylinder of a diesel engine, the present invention may be applied to: engines having one or more cylinders; various engine types, such as in-line, V type, and so forth; engines having different cylinder firing orders; diesel engines, gasoline engines, or other types of engines; turbocharged and non-turbocharged engines; engines of any size; and engines having fuel injectors that are capable of delivering two or more injections of fuel into the combustion chamber of the engine during an engine cycle.

The present invention provides a number of advantages. Engine stumble or rough engine operation is reduced during transitions in engine operation to and from multiple fuel injection operation. Smoother, more reliable and efficient engine operation and vehicle performance result, and vehicle drivability and engine sociability improve.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
   detecting a change in a number of fuel injections into a combustion chamber of an internal combustion engine;
   determining a timing adjustment period that begins when the change is detected;
   during the timing adjustment period, adjusting fuel injection timing.

2. The method of claim 1, wherein the step of adjusting comprises the step of incrementally adjusting the fuel injection timing based at least in part on an elapsed time from the detecting step.

3. The method of claim 1, wherein the step of detecting comprises detecting one of activation and deactivation of pilot fuel injection.

4. The method of claim 1, wherein the step of adjusting comprises adjusting main fuel injection timing.

5. The method of claim 1, wherein the step of adjusting comprises adjusting pilot fuel injection timing.

6. The method of claim 1, wherein the step of adjusting comprises:
   determining a timing offset;
   determining a multiplier based at least in part on the time elapsed since the detection of change;
   combining the timing offset with the multiplier, yielding a modified offset;
   utilizing the modified offset to adjust fuel injection timing.

7. A method comprising the steps of:
   detecting a change in a number of fuel injections into a combustion chamber of an internal combustion engine;
   determining a timing adjustment period;
   during the timing adjustment period, adjusting fuel injection timing incrementally based at least in part on time elapsed since the detection.

8. The method of claim 7, wherein the step of detecting comprises detecting one of activation and deactivation of pilot fuel injection.

9. The method of claim 7, wherein the step of adjusting comprises:
   determining a timing offset;
   determining a multiplier based at least in part on the time elapsed since the detection;
   combining the timing offset with the multiplier, yielding a modified offset;
   utilizing the modified offset to adjust fuel injection timing.

10. The method of claim 9, wherein the timing offset is based on at least one of engine speed and change in engine load.

11. The method of claim 9, wherein as time progresses, the multiplier is stepped incrementally between timing at detection of the change and steady state timing.

12. The method of claim 9, wherein the multiplier gradually changes during the timing adjustment period.

13. The method of claim 9, wherein the timing offset is a pilot injection timing offset.

14. The method of claim 9, wherein the timing offset is a main injection timing offset.

15. An apparatus comprising:
    an engine control module arranged and constructed to detect a change from a first number to a second number of fuel injections into a combustion chamber of an internal combustion engine, to determine a timing adjustment period, and to adjust fuel injection timing during the timing adjustment period;
    wherein the engine control module is operable with a fuel injection system capable of providing the first number and the second number of fuel injections into the combustion chamber, wherein the first number and the second number are not the same number.

16. The apparatus of claim 15, wherein fuel injection timing is offset based at least in part on time elapsed from detection of the change from the first number to the second number of fuel injections.

17. The apparatus of claim 15, wherein the first number is greater than the second number.

18. The apparatus of claim 15, wherein the first number is less than the second number.

19. The apparatus of claim 15, wherein adjustment to fuel injection timing includes adjustment to main fuel injection timing.

20. The apparatus of claim 15, wherein adjustment to fuel injection timing includes adjustment to pilot fuel injection timing.

* * * * *